United States Patent [19]
Sadahiro

[11] 3,753,630
[45] Aug. 21, 1973

[54] INTERNAL COMBUSTION ENGINE

[76] Inventor: Susumu Sadahiro, 1700, 2-chome, Ikebukuro, Toshima-ku, Tokyo, Japan

[22] Filed: Sept. 20, 1971

[21] Appl. No.: 182,080

[30] Foreign Application Priority Data
Sept. 25, 1970  Japan.............................. 45/84237

[52] U.S. Cl. ................................................ 418/36
[51] Int. Cl. ........ F01c 1/00, F04c 1/00, F04c 17/00
[58] Field of Search...................... 418/36; 123/8.47

[56] References Cited
UNITED STATES PATENTS

| | | | |
|---|---|---|---|
| 1,329,625 | 2/1920 | Noble .................................... | 418/36 |
| 3,385,272 | 5/1968 | Winogrodzki et al. ............ | 123/8.47 |
| 2,124,327 | 7/1938 | Wolstenholme ..................... | 418/36 |
| 3,280,803 | 10/1966 | Sabet ................................ | 123/8.47 |
| 1,665,581 | 4/1928 | Deny.................................... | 418/36 |
| 3,396,632 | 8/1968 | Leblanc ............................... | 418/36 |

FOREIGN PATENTS OR APPLICATIONS
681,342  1/1930  France.............................. 123/8.47

*Primary Examiner*—Carlton R. Croyle
*Assistant Examiner*—John J. Vrablik
*Attorney*—Kenneth S. Goldfarb

[57]  ABSTRACT

A pair of bottomed cylindrical members which are rotatable relative each other are installed in a casing so as to pressure-tightly define an annular space therewithin. This annular space is divided into several chambers by a diametrically opposed pair of vanes on the periphery of each of the aforesaid members, the vanes being pressure-tightly slidable therethrough. A rotatable disk is firmly mounted on a shaft extending axially through the casing and is connected with the respective bottomed cylindrical members by planetary gearing thereby to cause the diametrically opposed pairs of vanes to turn through the annular space in such a manner that each pair is alternately revolved through a predetermined angle while the other pair remains substantially unactuated.

3 Claims, 21 Drawing Figures

Patented Aug. 21, 1973

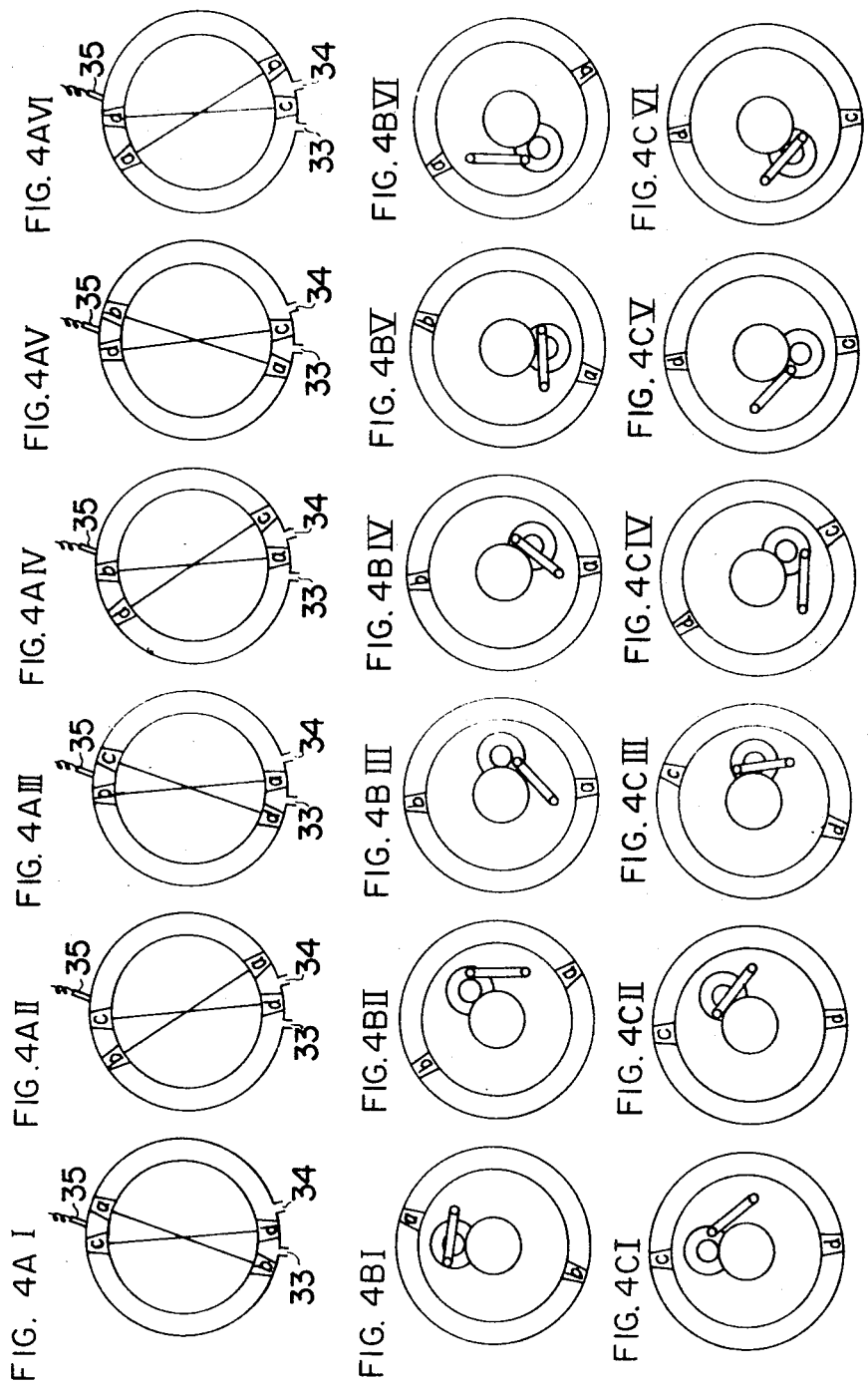

INTERNAL COMBUSTION ENGINE

This invention relates generally to engines and more particularly to a novel rotary-vane internal-combustion engine.

In an internal combustion engine, as heretofore constructed, the reciprocating motion of a piston or pistons has been translated into the rotary motion of a crankshaft by complex and bulky mechanisms. This has resulted in considerable waste of energy, much weight per horsepower, and large space requirement. Moreover, the air pollution caused by conventional automobile engines in particular is now a worldwide problem that must be solved urgently.

The NSU-Wankel rotary engine developed in Germany may be one solution to the above listed disadvantages of the prior reciprocating-piston engines. With a certain possible exception, however, no truly workable versions of the Wankel engine seem to be yet completed, perhaps due in part to the difficulties involved in maintaining pressure-tight joints at the apexes and on the end faces of an equilateral triangular rotor revolving in a substantially elliptical chamber. Nevertheless, the fact remains that rotary motion is far superior to reciprocating motion, in view of such benefits accruing from the former as mechanical simplicity and the absence of inertial forces from reciprocating parts.

Therefore, it is an object of the present invention to provide a rotary-vane internal-combustion engine of entirely novel construction.

Another object of the invention is to provide an engine of the character referred to, which offers smooth and vibration-less operation, which is less likely to pollute the air than reciprocating-piston engines, which is more powerful than the conventional engines of the same size and weight, and which is manufacturable at greatly reduced costs partly because of its mechanical simplicity.

Another object of the invention is to provide an engine of the character referred to, in which inlet and exhaust ports are opened and closed by rotary vanes themselves, not by poppet valves or the like as in reciprocating-piston engines, so that introduction of a fresh charge and exhaustion of consumed combustion gases are carried out both efficiently and quickly.

Still another object of the invention is to provide an engine of the character referred to, in which rotary vanes extending radially from rotor means defining an annular space within a casing are equipped with suitably large end faces in slidable contact with the inner surface of the casing, so that the several chambers formed in the annular space by these rotary vanes can be easily maintained in pressure-tight condition.

An additional object of the invention is to provide an engine of the above described character for particular use in various vehicles and the like, in which case the engine is so compact that it will leave enough space for installation of extra anti-pollution devices and other attachments or accessories.

The novel features which are considered as characteristic of the invention are set forth in particular in the appended claims. The invention itself, however, both as to its construction and its mode of operation, together with various other objects and advantages thereof, will be best understood from the following description of specific embodiments when read in connection with the attached drawings, in which:

FIGS. 4AI to FIG. 4CVI schematically illustrates, in sequence, the operating cycle of the engine of the present invention.

Figure 1:
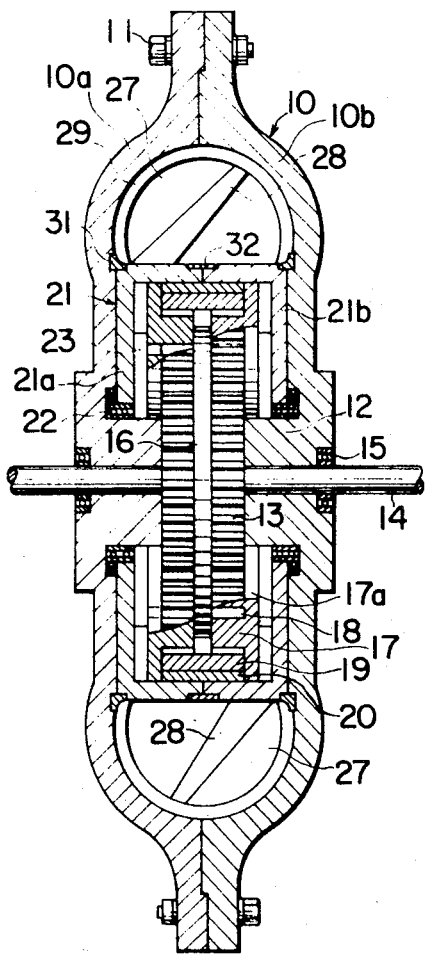
FIG. 1 is an axial sectional view of an engine constructed in accordance with the concepts of the present invention.
Figure 2:
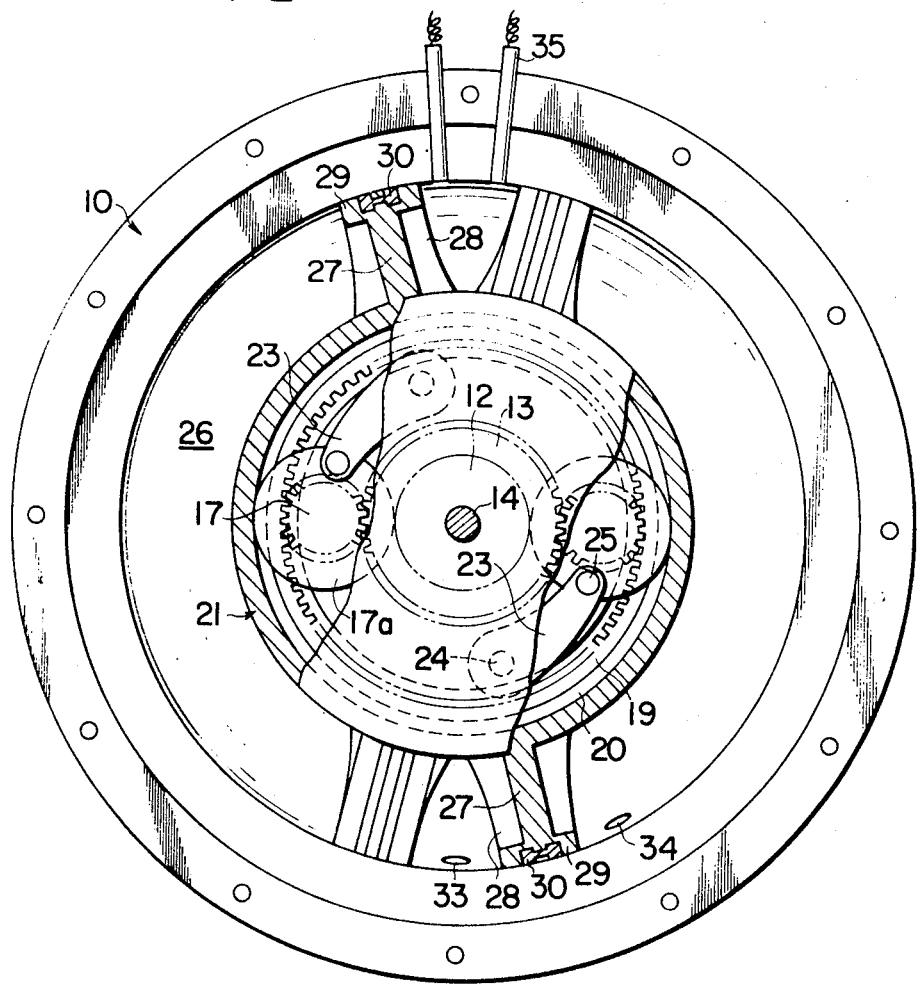
FIG. 2 is a partly broken away sectional view showing the inner details of the engine of FIG. 1 with one of its casing halves removed.

Referring now to the drawings, and first to all of FIGS. 1 and 2 thereof in order to describe the construction of the internal combustion engine illustrated therein by way of a preferred embodiment of this invention, a casing 10 consists of substantially identical halves 10a and 10b mated together by means such as bolts and nuts generally indicated by numeral 11. These casing halves are respectively integrally provided with inwardly projecting central portions 12 in alignment with each other, at the opposed ends of which are fixedly attached a pair of aligned sun gears 13 with a spacing therebetween. A shaft 14 extends centrally through these portions 12 and the sun gears 13 with substantial clearance and is rotatably supported by means of bearings 15 of suitable type.

Between the aforesaid sun gears 13 a rotatable disk 16 is fixedly mounted on the shaft 14, the disk 16 being greater in diameter than the sun gears 13. A plurality of, two in this embodiment, planet gears 17 are rotatably supported on each side surface of the disk 16 by means of pins 18 so as to be in mesh with the respective sun gears 13. Each of the sun gears 13 and each of the planet gears 17 may have their intermeshing teeth in the ratio of 2 to 1 for reasons hereinaftr to be referred to. The planet gears 17 are also meshed with an internally toothed ring gear 19. The periphery of this ring gear 19 is fixedly encircled by a ring or short cylindrical member 20 which is in internal slidable contact with rotor means 21.

The rotor means 21 includes a closely matched pair of substantially identical bottomed cylindrical members 21a and 21b which are rotatable relative each other, the rotor means 21 is supported by bearings 22 on the aforesaid inwardly projecting portions 12 while in slidable contact with the inner surfaces of the casing 10. Further on the inner surfaces of the rotor members 21a and 21b, arms 23 which are equal in number to the planet gears 17 are swingably supported each at one end by a pin 24, the other ends of the arm 23 being also swingably supported by pins 25 planted in flanges 17a formed at the outer ends of the planet gears 17. It is important that these arms be disposed forwardly of the planet gears 17 with respect to their rotational direction, which is clockwise as viewed in FIG. 2, for proper operation of this internal combustion engine to be described later in this specification.

In an annular space 26 defined within the casing 10 by the rotor means 21, a diametrically opposed pair of radial vanes 27 are firmly mounted on or formed integral with each of the members 21a and 21b of the rotor means 21. The shape of all these vanes 27 must be determined in conformity with the cross sectional shape of the annular space 26 so that the vanes slidably fit therein with minimum allowance, thereby partitioning the annular space into four operative chambers hereinafter to be described in detail. The vanes are respectively reinforced with support means 28 and have expansions 29 at their respective outer ends thereby to contact the inner surface of the casing 10 over greater area. A sealing member 30 of suitable cross sectional shape may be installed on the end face of each of the vanes 27 in order to prevent the leakage of gases and the like under pressure from one of the chambers to another.

Figure 3:
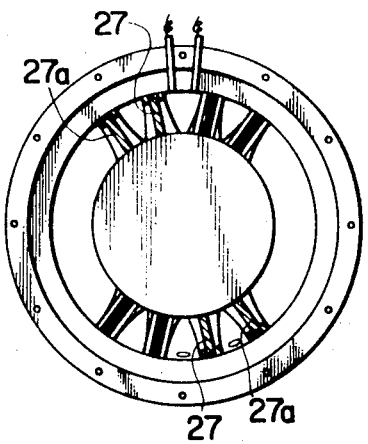
FIG. 3 is a similar view schematically illustrating a modified form of rotor vane arrangement.

For the same purpose, in a second preferred embodiment of the invention shown in FIG. 3, each of the vanes 27 is accompanied by an adjacently located auxiliary vane 27a of similar make. It is confirmed by this applicant that the aforesaid operative chambers are rendered still more pressure tight by this arrangement, contributing toward greater operating efficiency of the internal combustion engine itself.

Referring back to FIGS. 1 and 2, the desired pressure-tightness of the chambers may be further enhanced by the provision of sealing rings 31 between the rotor means 21 and the casing 10 and of another sealing ring 32 between the rotor members 21a and 21b. As best shown in FIG. 2, the annular space 26 is suitably provided with an inlet port 33, an exhaust port 34, and ignition means 35 such as one or more, two in this embodiment, spark plugs. These inlet and exhaust ports 33 and 34 may be each constituted of a meshlike arrangement of a number of minute openings thereby to facilitate the revolution of the vanes 27, with or without the auxiliary vanes 27a, in contact with the inner surface of the casing 10.

Proceeding now to the description of the operation of the preferred embodiments of the invention constructed substantially as in the foregoing, let it first be assumed that the shaft 14 is rotated clockwise, as viewed in FIG. 2, by some externally applied force. The resultant clockwise rotation of the disk 16 causes the planet gears 17, which are coupled therewith by the pins 18, both to revolve around the shaft 14 and to rotate on their own axes while in mesh with the respective sun gears 13 and the ring gear 19. Such movements of the planet gears 17 are conveyed through their arms 23 to the rotor members 21a and 21b, which then are rotated clockwise. Since each of the sun gears 13 has twice as many teeth as each of the planet gears 17 as aforesaid, these planet gears rotate on their own axes through an angle of 180°, for example, when they have revolved 90° around the respective sun gears 13. It will accordingly be understood that the arms 23 reciprocate or move back and forth while regularly varying the relative locations of the planet gears 17 and the rotor members 21a and 21 b by a distance equal to twice the radius of revolution of the pins 25 on the flanges 17a of the planet gears 17.

The fundamental operating principles of this invention briefly explained in the preceding paragraph are hereinafter described in greater detail with reference to FIG. 4 in particular. In the series of drawings shown in row A of FIG. 4, reference characters a and b denote the diametrically opposed pair of rotor vanes 27, with or without their auxiliary vanes 27a, on one of the rotor members 21a and 21b, while reference characters c and d denote the remaining rotor vanes 27, with or without their auxiliary vanes 27a, on the other of the rotor members. Consideration is first given to the movements of the vanes a and b only, in relation with the series of drawings shown in row B of FIG. 4.

Suppose that the shaft 14 is rotated clockwise as previously mentioned when one of the planet gears 17 with its arm 23 corresponding to the vanes a and b is in the condition illustrated in FIG. 4BI column I. It is already mentioned that when the planet gear 17 has revolved around the sun gear 13 through an angle of 90° it is rotated on its own axis through an angle of 180° Hence, in the condition of 4BIII column III, its arm 23 is moved forwardly of the planet gear 17 through the condition of FIG. 4BII column II, so that the rotor member 21a or 21b coupled therewith by that pin 24 is rotated through a greater angle than that (90° in this case) through which the planet gear 17 has revolved around the sun gear 13.

When the planet gear 17 attains the condition of FIG. 4BIV its rotation on its own axis is in excess of 180°, so that the arm 23 is moved backwardly of the planet gear 17 for a distance approximately twice the radius of revolution of the pin 25 around the axis of the planet gear 17. Thus the relative locations of this planet gear 17 and its arm 23 return to the initial condition of FIG. 4BI. Thereafter, as the planet gear 17 goes on revolving around the sun gear 13 while rotating on its own axis, its arm 23 moves back and forth alternately in a manner described hereinbefore, as illustrated in FIG. BV and FIG. 4BVI. It will be needless to say that the other planet gear 17 and its arm 23 corresponding to the rotor vanes a and b, though not shown in these drawings, operate in an identical manner.

While the foregoing description has been centered on the movements of the vanes a and b alone, it will be understood that the vanes c and d on the other rotor member 21a or 21b are moved similarly, only with the difference between the relative locations of the pins 25 on the flanges 17a of the planet gears 17 on both sides of the disk 16 as in rows B and C illustrating FIGS. 4BI-VI and FIGS. 4CI-VI. In this manner, when the respective planet gears 17 have been revolved around their respective sun gears 13 through an angle of 90° as in FIGS. 4AIII, FIG. 4BIII and FIG. 4CIII the arm 23 shown in row B, on the one hand, is moved forwardly of its planet gear 17 so that the rotor vanes a and b associated therewith are turned at faster speed and hence through a greater angle than this planet gear 17, to their positions of FIG. 4BIII. On the other hand, the arm 23 shown in row C is moved backwardly of its planet gear 17 so that the rotor vanes c and d associated therewith are turned only through a much smaller angle or are hardly turned at all.

As the planet gears 17 are succeedingly revolved around the sun gears 13 through another 90°, the arm 23 in row B is moved backwardly of its planet gear 17, on the one hand, with the result that the rotor vanes a and b are turned through a much smaller angle or are hardly turned at all as in the precedingly described case of the rotor vanes c and d. The arm 23 shown in row C, on the other hand, is moved forwardly of its planet gear 17 so that the rotor vanes c and d are turned faster and through an angle greater than the 90°.

Thereafter the procedure set forth in the preceding two paragraphs is reiterated. In accordance with such procedure of operation, the aforementioned inlet port 33, exhaust port 34 and ignition means 35 may be suitably provided to the casing 10 for proper operation of this internal combustion engine. Its complete cycle of operation, including suction, compression, expansion, and exhaust, is hereinafter described in relation particularly with the series of drawings shown in row A.

Let it now be assumed that the rotor vanes $a$, $b$, $c$ and $d$ on the rotor members 21a and 21b are first set in the positions shown in FIG. 4AI, with their corresponding planet gears 17 and their arms 23 in the respective conditions of FIG. 4BI and FIG. 4CI, and that the inlet port 33, the exhaust port 34 and the ignition means 35 are located as in the drawings of row A relative to the above assumed settings of the rotor vanes $a$, $b$, $c$ and $d$. When the shaft 14 is rotated clockwise, the vanes $a$ and $b$ are turned through a great angle as aforesaid, whereas the other vanes $c$ and $d$ remain substantially unactuated. Hence, as shown in FIG. 4AII, the vanes $a$ and $c$ and the vanes $b$ and $d$ are respectively widely spaced apart, in such a manner that the inlet port 33 is now located between the widely-spaced-apart vanes $d$ and $b$.

A fresh charge of fuel-air mixture is then drawn into a chamber formed between these two rotor vanes. From the condition of row A, column II, the vanes $a$, $b$, $c$ and $d$ shift to that of FIG. 4AII with their relative locations substantially unchanged. That is because the vanes $c$ and $d$ in this instance are being turned very slowly, with their planet gear 17 and arm 23 in the conditions of FIG. 4CII and FIG. 4CIII, so that the vanes $a$ and $b$ move close to the vanes $d$ and $c$, respectively, to the condition of FIG. 4AIII. In the transition from this condition to that of FIG. 4AVI the vanes $a$ and $b$ are turned very slowly or are hardly turned at all, whereas the vanes $c$ and $d$ are turned much faster and hence through a much greater angle. Thus the charge which has been trapped between the vanes $d$ and $b$ undergoes compression, and a fresh charge is again admitted into a chamber formed between the widely-spaced-apart vanes $a$ and $d$. As the vanes $a$, $b$, $c$ and $d$ move to the condition of row A, column V with their relative locations substantially unaltered, the compressed charge between the vanes $d$ and $b$ is carried to the ignition means 35.

The charge is now ignited. The ensuing expansion or power-producing period is almost completed in the condition of FIG. 4AVI, while at the same time the charge drawn between the vanes $a$ and $d$ at FIG. 4AI is almost fully compressed. As all the vanes are further turned clockwise, the compressed charge between the vanes $a$ and $d$ is carried to the ignition means 35, while the vane $b$ uncovers the exhaust port 34. The gaseous products of combustion between the vanes $d$ and $b$ are forced out through this exhaust port when the vane $d$ as well as the vane $c$ is turned clockwise upon ignition of the compressed charge between the vanes $a$ and $d$. The rotor vanes are succeedingly returned to the initial condition of row A, column I to complete the cycle. The repetition of this operating cycle provides the desired torque or turning force to the shaft 14.

Although the present invention has been shown and described in terms of some preferred embodiments thereof, it will be easy for those skilled in the art to devise many modifications thereof. For instance, instead of fixing the planet gears 17 meshing with the ring gear 19 to the rotatable disk 16 with the pins 18 as in the foregoing disclosure, these planet gears may be provided independent of the disk 16, that is without any such connecting means as the pins 18, while the disk 16 is formed substantially integral with the ring gear 19. In this manner the number of revolutions per unit length of time of the shaft 14 may be increased. This and other modifications within the skill of the specialists are contemplated as being within the scope of the invention herein disclosed.

I claim:

1. An engine comprising a comparatively flat, substantially circular casing, rotor means disposed in said casing in slidable contact therewith so as to leave an annular space therewithin, said rotor means including a pair of independently rotatable slidably engaging cylindrical members, a diametrically opposed pair of vanes on each of said rotatable members pressure-tightly dividing said annular space into a plurality of chambers, a rotatable shaft extending axially through said casing, a disk like member fixedly mounted on said shaft in the middle of said casing, a pair of sun gears on both sides of said disklike member fixedly mounted on said casing, a plurality of planet gears on each face of said disklike member respectively meshing with said sun gears, an internally toothed ring gear meshing with said planet gears, means surrounding said ring gear slidably engaging said rotor means, for operatively connecting said planet gears and said rotor means so as to cause said diametrically opposed pairs of vanes to turn through said annular space in such a manner that each pair is alternately revolved through a predetermined angle greater than the angle of revolution of said planet gears around said respective sun gears while the other pair remains substantially unactuated, an inlet and an exhaust port open to said annular space, and ignition means leading to said annular space.

2. An engine according to claim 1, wherein each of said sun gears have twice as many teeth as each of said planet gears.

3. An engine comprising a comparatively flat, substantially circular casing having inwardly projecting central portions in alignment with each other, rotor means disposed in said casing in slidable contact therewith so as to pressure-tightly define an annular space therewithin, said rotor means having a pair of bottomed slidably engaging cylindrical members mated together at their open ends and mounted on said inwardly projecting portions of said casing so as to be rotatable relative each other, a diametrically opposed pair of vanes on the periphery of each of said bottomed cylindrical members pressure-tightly partitioning said annular space into a plurality of chambers, each of said vanes being reinforced with support means and having its outer end expanded so as to contact the inner surface of said casing over greater area, each of said vanes being further accompanied by an adjacently located auxiliary vane of similar make for the desired pressure-tightness of said chambers, a rotatable shaft extending axially through said casing a disk fixedly mounted on said shaft and substantially bisecting the interior of said mated pair of bottomed cylindrical members, a pair of aligned sun gears securely attached to the opposed ends of said inwardly projecting portions of said casing on both sides of said disk, at least two planet gears rotatably supported on each face of said disk and meshing with the corresponding one of said sun gears, a flanged outer end on said planet gears, each of said sun gears having twice as many teeth as each of said planet gears, an internally toothed ring gear meshing with said planet gears, means surrounding said ring gear slidably engaging said rotor, a plurality of arms each swingably connected at one end to the flanged outer end of said planet gears and at the other end to the corresponding one of said bottomed cylindrical members so as to cause said diametrically opposed pairs of vanes to turn through said annular space in such a manner that each pair is alternately revolved through a predetermined angle greater than the angle of revolution of said planet gears around said respective sun gears while the other pair remains substantially unactuated, an inlet and an exhaust port open to said annular space, and a pair of spark plugs leading to said annular space.

* * * * *